Nov. 10, 1959  R. W. SIMMONS  2,912,519
MOUNTING FOR MAGNETIC HEAD
Filed July 3, 1957  2 Sheets-Sheet 1

ROBERT W. SIMMONS
INVENTOR.

BY Daniel J. Mayne
Robert F. Crocker

ATTORNEYS

Nov. 10, 1959   R. W. SIMMONS   2,912,519
MOUNTING FOR MAGNETIC HEAD
Filed July 3, 1957   2 Sheets-Sheet 2

ROBERT W. SIMMONS
INVENTOR.

BY Daniel J. Mayne
Robert T. Crocker
ATTORNEYS

United States Patent Office 2,912,519
Patented Nov. 10, 1959

2,912,519

MOUNTING FOR MAGNETIC HEAD

Robert W. Simmons, Rochester, N.Y., assignor to Eastman Kodak Company, Rochester, N.Y., a corporation of New Jersey Application July 3, 1957, Serial No. 669,725

5 Claims. (Cl. 179—100.2)

This application relates to an improved mounting for a magnetic head and particularly to such a mounting which may be applied to a conventional motion picture sound projector so that the latter may be used to reproduce either magnetic or photographic sound tracks.

It has, for many years, been quite customary to provide motion picture projectors with a photo-cell controlled sound system capable of producing sound from a photographic sound track on a motion picture film. In more recent years, magnetic sound tracks have come into fairly general use on motion picture films and it is quite desirable therefore to provide motion picture sound projections with means for selectively reproducing sound from either photographic or magnetic sound tracks.

It is an object of this invention to provide a relatively simple mounting arrangement whereby a magnetic sound head or transducer may be applied to a motion picture projector for permitting the projector to be used to reproduce sound from films having magnetic sound tracks thereon.

It is a further object to provide such a head mounting arrangement which will require but little modification of existing equipment and which will in no way interfere with the usefulness of an optical-sound type projector insofar as its use with film having a photographic sound track is concerned.

A still further object is to provide a means for mounting a magnetic head adjacent the normal sound drum of a motion picture sound projector, said mounting means including provisions for accurately positioning the head in the desired relationship to the film traveling around the sound drum.

Further objects will become apparent from the following description and claims, particularly when considered in the light of the accompanying drawings wherein:

Figure 6:
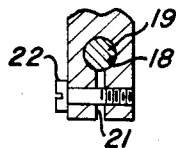
Figure 5:
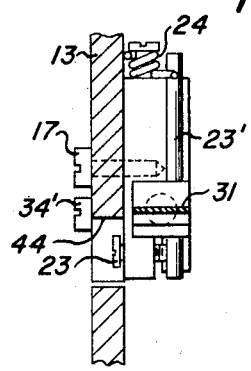
Figure 4:
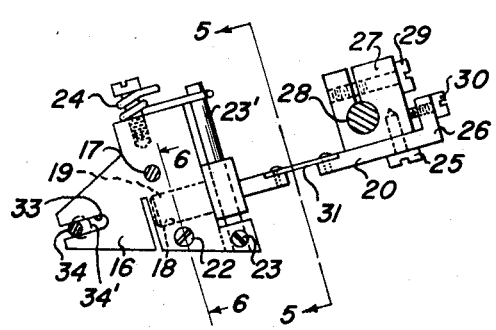
Figure 4 is a side view of the head mounting arrangement per se.

Figures 5 and 6 are fragmentary sectional views taken on the lines 5—5 and 6—6 respectively, of Figure 4.

Figure 1:
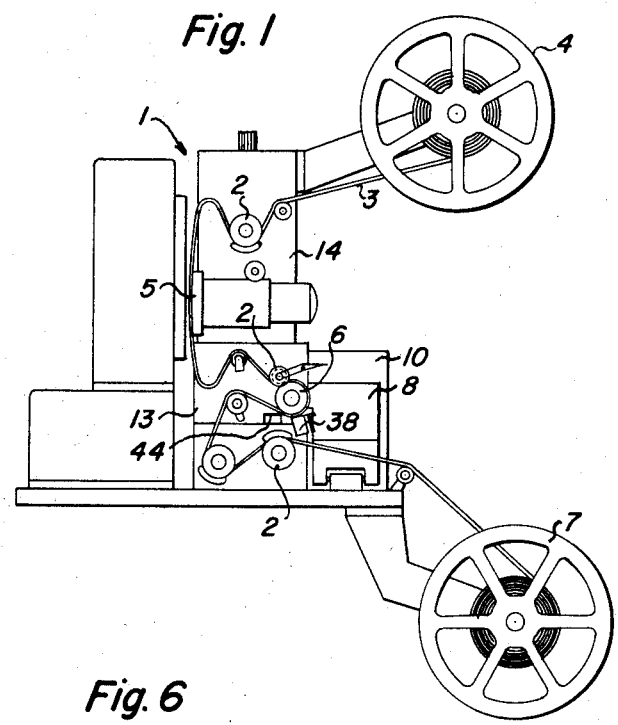
Figure 1 is a side view of a conventional motion picture sound projector having the invention applied thereof.

As shown in Figure 1, the invention is illustrated as being applied to a conventional motion picture sound projector 1 provided, as is usual, with a plurality of film guiding and feeding rollers 2 for feeding motion picture film 3 from a supply reel 4, past the projection gate 5, around a sound drum 6, and then to a takeup reel 7. As the film passes around the sound drum 6, a narrow line of light, derived from an exciter lamp and sound optics (not shown) located within a housing 8, may be directed against the edge of the film bearing the conventional photographic sound track. The light transmitted through the sound track is then reflected by a mirror or prism 9 and directed through a suitable opening 45 (Fig. 3), formed in the front plate 46 of the feed mechanism housing 14, to a suitable photocell (not shown) mounted within an amplifier housing 10. As is conventional, the sound drum 6 is mounted on a shaft 11 journalled in a suitable bearing 12 carried by a side plate 13 of the mechanism housing 14. As thus far described, the motion picture projector is entirely conventional.

Figure 3:
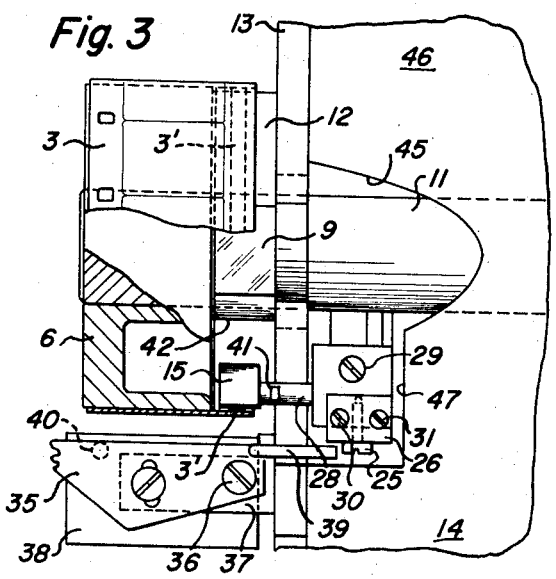
Figure 3 is a fragmentary front view of the sound drum portion of the projector, with parts broken away to show the specific details of construction.

The invention resides in the novel arrangement for mounting a magnetic head or transducer 15 adjacent the path of film 3 as it passes around the sound drum 6 so that this same projector may utilize film having a magnetic sound track thereon. Such a magnetic sound track is shown in Fig. 3 at 3', the track being applied on the inner face of the film along the edge thereof which overhangs the side of drum 6. To this end, a bracket 16, best shown in Figure 4, is pivotally mounted by a suitable bolt 17 on the inner face of the plate 13 so that the bracket 16 is mounted for limited pivotal adjustment about an axis spaced from and parallel to the axis of the sound drum 6. Bracket 17 is provided with a cylindrical bore 18, the axis of which extends generally perpendicular to the axis of bolt 17 and which is adapted to receive the cylindrical shank 19 of an elongated arm assembly 20 extending from bracket 16 generally toward the sound drum 6. Thus, the arm 20 is rotatable about the axis of the bore 18. The bracket 17 is slotted as at 21 and a screw 22 is provided for rigidly clamping the shank 19 in desired adjusted position in the bore 18. Arm 20 is provided, adjacent its shank end, with a rod or bar 23' rigidly secured thereto and the lower end of which is adapted to be engaged by the end of an adjusting screw 23, carried by the bracket 16. The upper end of rod 23' is adapted to be engaged by a spring 24, acting against the inner face of plate 13 so as to normally tend to rotate the arm 20 in a clockwise direction as viewed in Figures 5 and 6. Plate 13 is cut away as at 44 to provide access to screws 22 and 23 from the exterior of the mechanism housing 14.

Figure 2:
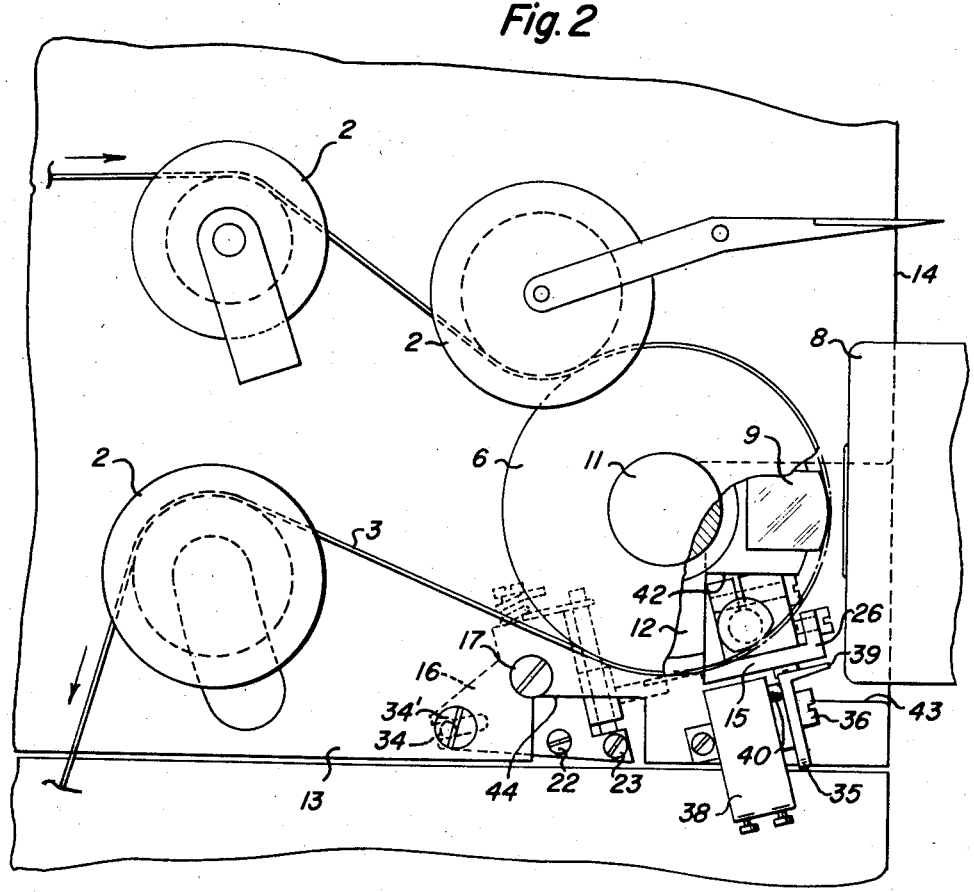
Figure 2 is an enlarged side view of the portion of the projector adjacent the sound drum, portions thereof being broken away to better illustrate the construction.

Pivotally carried by a bolt 25, adjacent the outer end portion 26 of the arm 20, is a clamping bracket 27 which in turn is adapted to receive the cylindrical shank 28 which extends laterally from the magnetic head 15. As shown in Figs. 2 and 3, the head 15 is positioned in the general plane of the bracket 12, this bracket and plate 13 being cut away as at 42 and 43 to provide clearance for the head 15 and its shank 28. Screw 29 serves to clamp the head in the desired adjusted position about the axis of the head shank 28, while screws 30 and 31 serve to angularly adjust the position of the clamping bracket 27 about the axis of bolt 25. As shown in Fig. 3 the opening 45 in plate 46 is extended downwardly as at 47 to permit access to screws 29, 30 and 31 from the exterior of housing 14.

As best shown in Figs. 4 and 5 the intermediate portion of the arm 20 is in the form of a flat spring 31 adapted to permit limited resilient deflection of the head 15 generally radially of the sound drum. As shown in Figs. 2 and 3 the sound head is intended, in operating condition, to bear against the inner surface of the film as it traverses the sound drum 6, the degree of tension with which the head bears against the film being controlled by positioning the bracket 16 about the pivot bolt 17. For this purpose the rear end of bracket 16 is slotted as indicated at 33 and is adapted to be engaged by the eccentric end portion 34 of an adjusting screw 34' carried by plate 13.

When it is desired that the magnetic sound system be rendered inactive, the head 15 may be lifted out of contact with the film 6, a lever 35 being provided for this purpose. As best shown in Figs. 2 and 3 lever 35 may conveniently be pivoted as at 36 to a bracket 37 carried on the outer face of plate 13 and conveniently also mounting a switch 38. The inner end portion 39 of lever 35 is adapted to engage the underside of the arm portion 26 so that when the outer end of the lever is swung downwardly, the portion 39 will lift the head 15 against the opposition of the spring element 31. Switch 38 may conveniently be arranged so that operation of the lever 35 to bring the head 15 into operative or inoperative position will simultaneously actuate the switch 38, which may be used to control the associated amplifier circuitry, exciter lamp, etc. in accordance with the position of the head 15. Thus, switch 38 is shown as being provided with an actuating plunger 40 which is adapted to be operated by the movement of the lever 35. No attempt has been made to illustrate the specific switching circuitry, since this will depend, of course, upon the desired mode of operation of the apparatus and forms no part of the instant invention.

It is believed that the operation of the improved head mount will be clear from the previous description. It should be noted that the head 15 may be readily adjusted relative to bracket 16 about each of three generally perpendicularly related axes, namely, the axis of shank 28, the axis of bolt 25, and the axis of shank 19. Adjustment of the head about the axis of shank 28 may be readily performed by application of a small wrench engaging suitable flats 41 formed on the side of the shank 28. Once the head 15 is positioned so that the gap in the head coincides with the line of contact between the film and the head, clamping screw 29 may be tightened to rigidly maintain the parts in this desired relationship. The so-called azimuth adjustment of the head may be conveniently performed by slightly loosening bolt 25 and then using adjusting screws 30 and 31 to position block 27 about the axis of bolt 25, until the head gap extends exactly at right angles to the path of movement of the film, and then tightening bolt 25 to lock the parts in the adjusted position. Adjustment of the head to insure that contact with the film occurs across the entire effective width of the head may be performed by loosening bolt 22 and then rotating the arm 20 about the axis of bore 18 by means of adjusting screw 23 and then again tightening bolt 22. The degree of tension of the head 15 against the sound track 31 may be adjusted by loosening pivot bolt 17 and rotating eccentric screw 34' so as to swing bracket 16 in the desired direction about the axis of bolt 17. When the desired tension has been attained, bolt 17 may again be tightened to hold the parts in their desired adjusted condition.

At any time that it is desired to render the magnetic sound system inactive, the outer end of lever 35 may be swung downwardly to simultaneously lift the head out of engagement with the film and to actuate the control switch 38.

From the above it is believed clear that the arrangement described herein provides a relatively simple, yet highly effective arrangement for adding a magnetic head or transducer to a conventional motion picture projector of the optical-sound type and that the addition of such a head, utilizing the mounting arrangement shown, involves a minimum of alteration of the projection apparatus. Moreover, with the mounting arrangement disclosed herein, the normal use of the optical sound system is in no way interfered with. While the invention has been disclosed as applied to one particular form of motion picture projector, it is obvious that it may equally well be applied to other types of projectors and that various changes in the specific details may be made without departing from the spirit and scope of the invention as defined by the appended claims.

I claim:
1. In a motion picture projector having a rotatable sound drum and means including a supporting plate and a plurality of guide means carried on said plate for guiding motion picture film along a predetermined path in intimate contact with the periphery of said sound drum and with the film overhanging the side of said sound drum facing said plate, a bracket mounted on said plate for limited pivotal movement about an axis spaced laterally from and parallel to the axis of said drum, a magnetic sound head, and means including an elongated arm for supporting said head from said bracket and providing for independent adjustment of said head relative to said bracket about each of three mutually perpendicular axes, said arm extending from said bracket generally toward said drum and including a resilient portion providing limited swinging movement of said head in a plane substantially perpendicular to said drum axis, means for positioning said bracket about its mounting axis whereby said arm resiliently urges said head into an operative position wherein said head is in a position to engage said overhanging portion of said film on the inner face thereof as it passes around said drum, and means for selectively swinging said head against the tension of said resilient arm portion into an inoperative position spaced generally radially inwardly from said film path.

2. In a sound projector for motion picture film having a mechanism supporting plate and a sound drum rotatably carried on one side of said plate and around which said film travels with one edge portion thereof overhanging the side of said drum facing said plate, a magnetic sound head adapted to engage the inner face of said overhanging portion as it traverses said drum, and means for mounting said head for movement between a predetermined operative position in engagement with said film and an inoperative position in which said head is retracted inwardly from the path of movement of said film around said drum, said mounting means comprising a bracket pivotally mounted on said plate for limited adjustment about a first axis parallel to and spaced laterally from the axis of said sound drum, an elongated arm carried by said bracket for limited rotational movement relative thereto about a second axis extending longitudinally of said arm and generally perpendicular to said first axis, said arm extending from said bracket generally toward said drum, a clamp member carried by the free end of said arm for limited rotational movement relative thereto about a third axis generally perpendicular to both said first and second axes, said head including a shank portion extending laterally thereof and rotatably carried by said clamp member for adjustment of said head about a fourth axis generally perpendicular to said second and third axes, said arm including a resilient portion intermediate said bracket and said clamp adapted to permit movement of said head relative to said drum by deflection of the free end of said arm in a plane generally perpendicular to said drum axis, means for securing said bracket in a predetermined adjusted position about said first axis wherein said arm resiliently urges said head into said operative film-engaging position, and means for securing said head in predetermined adjusted position relative to said bracket about each of said second, third and fourth axes.

3. In a sound projector for motion picture film having a mechanism supporting plate and a sound drum rotatably carried on one side of said plate and around which said film travels with one edge portion thereof overhanging the side of said drum facing said plate, a magnetic sound head adapted to engage the inner face of said overhanging portion as it traverses said drum, and means for mounting said head for movement between a predetermined operative position in engagement with said film and an inoperative position in which said head is retracted inwardly from the path of movement of said film around said drum, said mounting means comprising a bracket pivotally mounted on said plate for limited adjustment about a first axis parallel to and spaced laterally from the axis of said sound drum, an elongated arm carried by said bracket for limited rotational movement relative thereto about a second axis extending longitudinally of said arm and generally perpendicular to said first axis, said arm extending from said bracket generally toward said drum, a clamp member carried by the free end of said arm for limited rotational movement relative thereto about a third axis generally perpendicular to both said first and second axes, said head including a shank portion extending laterally thereof and rotatably carried by said clamp member for adjustment of said head about a fourth axis generally perpendicular to said second and third axes, said arm including a resilient portion intermediate said bracket and said clamp adapted to permit movement of said head relative to said drum by deflection of the free end of said arm in a plane generally perpendicular to said drum axis, means for securing said bracket in a predetermined adjusted position about said first axis wherein said arm resiliently urges said head into said operative film-engaging position, and means for securing said head in predetermined adjusted position relative to said bracket about each of said second, third and fourth axes, means for selectively moving said head inwardly generally radially of said drum from its operative film engaging position to its inoperative retracted position against the tension of said resilient arm portion.

4. In a magnetic sound apparatus, means including a rotatable drum for feeding and guiding a record strip bearing a magnetizable sound track along a predetermined path with said strip engaging said drum about a portion of the periphery thereof and with the magnetizable sound track overhanging one side of said drum and facing radially inwardly of said drum, a magnetic transducer, and means for mounting said transducer in position to engage said sound track as it moves about said drum comprising a bracket mounted on said apparatus for limited pivotal movement about an axis spaced laterally from and parallel to the axis of said drum, an elongated arm carried by said bracket and extending therefrom generally toward said drum, said arm being carried by said bracket for limited rotational movement relative thereto about a second axis extending longitudinally of said arm and generally perpendicular to said first axis, means for mounting said transducer on the end of said arm adjacent said drum and in position to engage said sound track, the intermediate portion of said arm being resiliently flexible in a plane generally perdendicular to the drum axis, means for positioning said bracket about said first axis whereby said transducer will be resiliently urged into engagement with said sound track for magnetic coaction therewith, and means for selectively engaging the transducer-carrying end of said arm to move said transducer generally radially inwardly of said drum against the resilience of said intermediate arm portion into an inactive position spaced from said sound track.

5. In magnetic sound apparatus for use with a magnetic record member and including a magnetic transducer and means for moving said record member past said transducer, mounting means for said transducer comprising an elongated arm having an intermediate portion thereof resiliently flexible in a given plane, means mounting said transducer from one end of said arm for independent limited adjustment relative thereto about a first axis lying in said plane and a second axis generally perpendicular thereto, and means for mounting the other end of said arm on said apparatus for independent limited adjustment about an axis extending substantially lengthwise of said arm and an axis substantially perpendicular to said lengthwise extending axis.

References Cited in the file of this patent
UNITED STATES PATENTS

| | | |
|---|---|---|
| 2,535,480 | Begun | Dec. 26, 1950 |
| 2,605,364 | Masterson | July 29, 1952 |
| 2,618,710 | Camras | Nov. 18, 1952 |
| 2,644,856 | Pettus | July 7, 1953 |
| 2,647,755 | Townsley | Aug. 4, 1953 |
| 2,676,023 | Isom | Apr. 20, 1954 |
| 2,705,640 | Del Valle | Apr. 5, 1955 |